(12) United States Patent
Nabeto et al.

(10) Patent No.: US 10,181,805 B2
(45) Date of Patent: Jan. 15, 2019

(54) VIBRATION POWER GENERATOR

(71) Applicant: OMRON Corporation, Kyoto-shi, Kyoto (JP)

(72) Inventors: Misato Nabeto, Nara (JP); Tatsuakira Masaki, Kyoto (JP); Keiki Matsuura, Nara (JP)

(73) Assignee: OMRON Corporation, Kyoto (JP)

( * ) Notice: Subject to any disclaimer, the term of this patent is extended or adjusted under 35 U.S.C. 154(b) by 981 days.

(21) Appl. No.: 14/411,771

(22) PCT Filed: Jun. 19, 2013

(86) PCT No.: PCT/JP2013/066864
§ 371 (c)(1),
(2) Date: Dec. 29, 2014

(87) PCT Pub. No.: WO2014/013835
PCT Pub. Date: Jan. 23, 2014

(65) Prior Publication Data
US 2015/0137659 A1 May 21, 2015

(30) Foreign Application Priority Data

Jul. 19, 2012 (JP) .................................. 2012-160398

(51) Int. Cl.
*H02N 1/00* (2006.01)
*H02N 1/08* (2006.01)
*H02N 1/10* (2006.01)

(52) U.S. Cl.
CPC .............. *H02N 1/08* (2013.01); *H02N 1/004* (2013.01); *H02N 1/10* (2013.01)

(58) Field of Classification Search
CPC ............ H01N 1/10; H01N 1/08; H01N 1/004; H01N 1/006; H02N 1/10; H02N 1/08;
(Continued)

(56) References Cited

U.S. PATENT DOCUMENTS 8,710,712 B2 * 4/2014 Nakatsuka ............... H02N 1/10
310/300
2008/0122313 A1 * 5/2008 Mabuchi ................ H02N 1/004
310/309

(Continued)

FOREIGN PATENT DOCUMENTS

EP    2469700 A1    6/2012
JP    2008-161036 A    7/2008
(Continued)

OTHER PUBLICATIONS

WO 2011021488 A1 machine translation Oct. 14, 2017.*
(Continued)

*Primary Examiner* — Bernard Rojas
*Assistant Examiner* — Leda Pham
(74) *Attorney, Agent, or Firm* — Osha Liang LLP

(57) ABSTRACT

Power generated by a vibration power generator utilizing an electret is efficiently supplied to a power supply load. A vibration power generator includes a first substrate and a second substrate configured to be moved relative to each other by external vibration while remaining opposite each other, a group of a plurality of electrets arranged in the relative movement direction on one surface side of the first substrate, and a group of electrodes arranged in the relative movement direction on a surface side of the second substrate opposite to the group of electrets, and including a first current collecting electrode and a second current collecting electrode. A power supply load to which power generated by the external vibration is supplied and which has an impedance lower than an internal impedance of the vibration power generator is electrically connected to each of the first and second current collecting electrodes.

9 Claims, 6 Drawing Sheets

(58) Field of Classification Search
CPC .......... H02N 1/00; H02N 1/002; H02N 1/006; G03B 3/10; G03B 13/34
See application file for complete search history.

(56) References Cited

U.S. PATENT DOCUMENTS

| | | | | |
|---|---|---|---|---|
| 2010/0052469 A1* | 3/2010 | Naruse | ................... | H02N 1/006 |
| | | | | 310/300 |
| 2012/0306313 A1* | 12/2012 | Nakatsuka | ............... | H02N 1/08 |
| | | | | 310/300 |
| 2013/0134828 A1* | 5/2013 | Okada | ...................... | H02N 1/08 |
| | | | | 310/300 |
| 2013/0221799 A1* | 8/2013 | Nakatsuka | ............. | H02N 1/004 |
| | | | | 310/300 |

FOREIGN PATENT DOCUMENTS

| | | | | |
|---|---|---|---|---|
| JP | 2008-161040 A | 7/2008 | | |
| JP | 2009-219353 A | 9/2009 | | |
| JP | 2009-284663 A | 12/2009 | | |
| JP | WO 2011021488 A1 * | 2/2011 | .............. | H02N 1/08 |
| JP | 2012-085515 A | 4/2012 | | |

OTHER PUBLICATIONS

Extended European Search Report issued in corresponding European Application No. 13820193.4 dated May 6, 2016 (7 pages).
International Search Report issued in PCT/JP2013/066864 dated Aug. 6, 2013 (1 page).

* cited by examiner

VIBRATION POWER GENERATOR

TECHNICAL FIELD

The present invention relates to a vibration power generator that generates power by external vibration utilizing an electret.

BACKGROUND ART

With the recent energy saving trends, attention has been paid to commonly available environmental energy that is independent of fossil fuels and the like. Power generation energy based on sunlight, wind power, or the like is widely known as environmental energy. Commonly available vibration energy may be environmental energy having no lower energy density than the above-described types of power generation energy.

Vibration power generators have been developed which generate power utilizing the vibration energy. An electret that can semipermanently retain charge is widely used for such power generators (see, for example, Patent Literatures 1 to 3). This technique provides a power generator utilizing an electret and including a pair of movable substrates disposed opposite each other and reciprocating to generate power, electrets disposed on one of the substrates, and current collecting electrodes disposed on the other substrate to collect charge generated by the action of the electrets on the opposite substrate. Each current collecting electrode in the pair of current collecting electrodes is grounded via a load resistor to which generated power is supplied. The charge collected by the movable substrates is aggregated and supplied to the load via a rectifier.

CITATION LIST

Patent Literature

[PTL 1]
Japanese Patent Application Laid-open No. 2008-161036
[PTL 2]
Japanese Patent Application Laid-open No. 2008-161040
[PTL 3]
Japanese Patent Application Laid-open No. 2009-219353

SUMMARY OF INVENTION

Technical Problem

Conventionally developed vibration power generators utilizing electrets adopt the above-described structure in order to allow the current collecting electrodes to efficiently collect charge by adopting the electrets. However, the conventional technique makes no reference to migration of charge from the current collecting electrode to the load, that is, efficient supply of generated power.

On the other hand, the applicant has found an event in which, when charge collected by the current collecting electrodes provided on the movable substrate in the vibration power generator utilizing the electret, the flow of the charge into the power supply load is hindered. An increased degree of the hindrance means that deriving power generated by the vibration power generator to the outside becomes difficult. Thus, the hindrance to the flow of the charge into the power supply load, as it were, suppresses the substantial power generation performance of the vibration power generator. This is undesirable.

With the foregoing in view, it is an object of the present invention to provide a vibration power generator that enables power generated by the vibration power generator utilizing an electret to be efficiently supplied to a power supply load.

Solution to Problem

To accomplish this object, the present invention provides a vibration power generator utilizing an electret and adopting a configuration including a pair of current collecting electrodes provided on a substrate opposite to the electret to collect generated power and power supply loads connected to the respective current collecting electrodes of the pair of current collecting electrodes, thus enabling charge from each of the current collecting electrodes to flow into the corresponding power supply load. In this regard, the power supply load has an impedance set lower than the internal impedance of the vibration power generator to enable efficient power supply to the power supply load.

Specifically, the present invention provides a vibration power generator including a first substrate and a second substrate configured to be moved relative to each other by external vibration while remaining opposite each other, a group of a plurality of electrets arranged in the relative movement direction on one surface side of the first substrate, and a group of electrodes arranged in the relative movement direction on a surface side of the second substrate opposite to the group of electrets, and including a first current collecting electrode and a second current collecting electrode, wherein a power supply load to which power generated by the external vibration is supplied and which has an impedance lower than an internal impedance of the vibration power generator is electrically connected to each of the first and second current collecting electrodes.

The vibration power generator according to the present invention utilizes the characteristics of electrets which allow charge to be semipermanently retained, whereby a variation in charge capacity, which results from the external variation between the group of electrodes and the group of electrets provided on the two substrates that can be moved relative to each other, is derived by the first and second current collecting electrodes and supplied to the power supply load. In the vibration power generator, the power supply load is connected to each of the first and second current collecting electrodes to allow charge collected by the current collecting electrode to be supplied to the power supply load. However, the applicant has made effort to find an event that hinders the flow of charge on the current collecting electrode into the power supply load.

In an electrode configuration in which the first current collecting electrodes and the second current collecting electrodes are arranged along the relative movement direction of the first substrate and the second substrate, an imaginary capacitance section in which charge is stored (parasitic capacitance section) is expected to be present between the first current collecting electrode and the second current collecting electrode. The parasitic capacitance section's capability of storing charge, that is, the parasitic capacitance, is expected to be significantly affected by the sizes of side surfaces (side end surfaces) of the adjacent substrates and the distance between the substrates. However, the presence of a parasitic capacitance of a given magnitude is expected to hinder the charge on the current collecting electrode from being migrated to the power supply load, restraining generated power from being efficiently supplied. When the quantity of energy accumulated in the parasitic capacitance section increases, smooth supply of power to the power supply load is hindered, limiting the vibration power generator's capability of supplying power to the power supply load.

Thus, the vibration power generator according to the present invention adopts a configuration in which the power supply load with an impedance lower than the internal impedance of the vibration power generator is connected to each of the first and second current collecting electrodes. The applicant has made effort to find that the adverse effect of a parasitic capacitance section that may be present between the first current collecting electrode and the second current collecting electrode can be reduced by adopting the above-described correlation between the current collecting electrode and the power supply load. That is, conventionally, attempts are generally made to derive power generated by the vibration power generator by connecting to a load with an impedance matching the internal impedance of the vibration power generator. However, the applicant has found that, when the impedance of the power supply load connected to each of the current collecting electrodes is set lower than the internal impedance, the total amount of power that may be supplied to the power supply load both by the first current collecting electrode and by the second current collecting electrode can consequently be increased.

The power supply load connected to each current collecting electrode may or may not be grounded as long as power is suitably supplied to the load. For example, as described below, when an output voltage from the vibration power generator is rectified and the rectified voltage is supplied to the power supply load, whether or not the power supply load needs to be grounded may be appropriately determined depending on the aspect of the corresponding rectifier.

In the vibration power generator, the impedance of the power supply load may be set to a value close to a predetermined high-efficiency impedance within a predetermined range of impedances lower than the internal impedance of the vibration power generator, the high-efficiency impedance serving to maximize an amount of generated power supplied to the power supply loads connected to the first current collecting electrode and the second current collecting electrode, respectively. When the impedance of the power supply load is thus set to a value close to the predetermined high-efficiency impedance, the present configuration enables power to be more efficiently supplied to the load than a configuration in which the current collecting electrode is connected to a load with an impedance matched with the internal impedance of the vibration power generator as is the case with the conventional technique. The degree of "closeness" in the value close to the predetermined high-efficiency impedance is a deviation from the predetermined high-efficiency impedance which is accepted provided that the high-efficiency power supply can be confirmed.

Furthermore, in the above-described vibration power generator, when the power supply loads connected to the first current collecting electrode and the second current collecting electrode, respectively, are formed as an identical power supply load, the first current collecting electrode and the second current collecting electrode are connected to the identical power supply load via an identical rectifier. When the current collecting electrodes and the power supply load are connected together via the rectifier as described above, outputs from the current collecting electrodes can be suitably synthesized and supplied to the power supply loads. The rectifier may be a full wave rectifier, by way of example. Alternatively, the rectifier may be a both wave rectifier, and in that case, the first current collecting electrode and the second current collecting electrode may be connected to the power supply loads via individually formed rectifiers.

Instead of a form in which the power supply loads connected to the first current collecting electrode and the second current collecting electrode are formed as an identical power supply load, a configuration is possible in which the power supply load electrically connected to the first current collecting electrode and the power supply load electrically connected to the second current collecting electrode are grounded independently of each other to allow power collected by the current collecting electrodes to be supplied to the power supply loads connected to the respective current collecting electrodes.

Additionally, in the above-described vibration power generator, the power supply load may be a load resistor, a capacitance, or the like provided that generated power is supplied to the load. More specifically, the power supply load may be a power storage circuit that accumulates supplied generated power, a load circuit that performs a predetermined operation using supplied generated power as a power supply (for example, a circuit including a sensor that detects a predetermined parameter or a wireless circuit that transmits the detected parameter), a voltage conversion circuit that coverts the voltage of the supplied generated power, or a combination of any of the power storage circuit, the load circuit, and the voltage conversion circuit.

Advantageous Effects of Invention

Power generated by a vibration power generator utilizing an electret can be efficiently supplied to a power supply load.

DESCRIPTION OF EMBODIMENTS

A vibration power generator 1 according to the present invention will be described below with reference to the drawings. Configurations of embodiments described below are illustrative, and the present invention is not limited to the configuration of the embodiments.

Example 1

Figure 1:
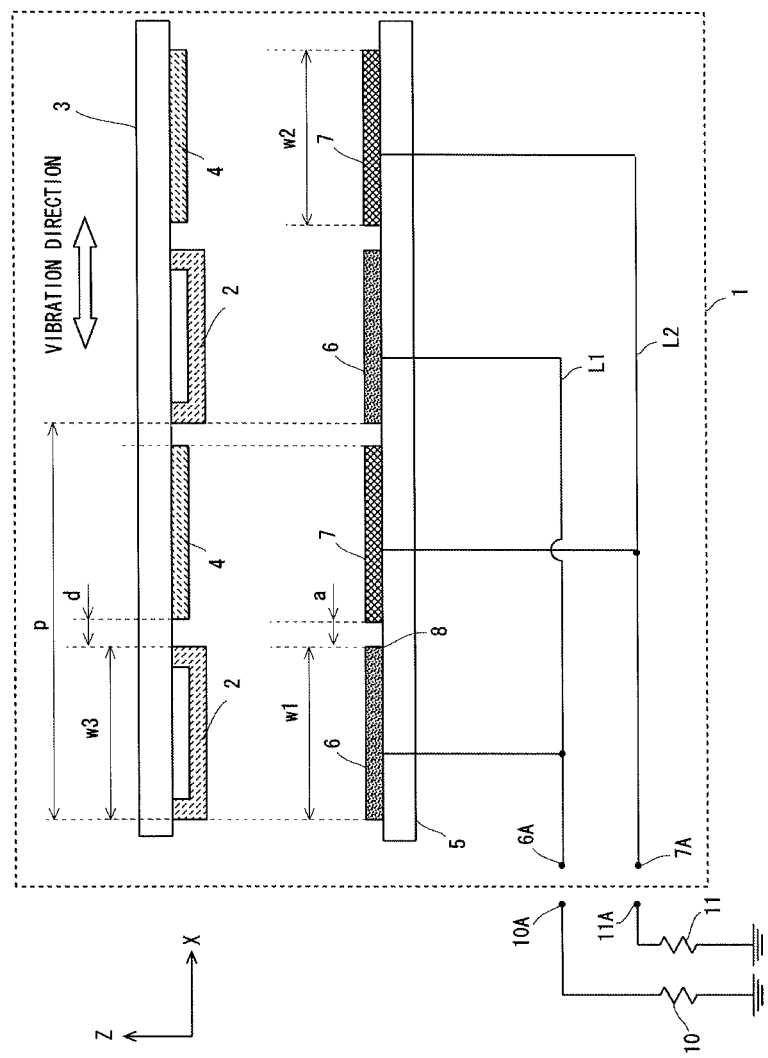
FIG. 1 is a diagram depicting a general configuration of a vibration power generator according to a first embodiment of the present invention.

FIG. 1 is a general configuration of the vibration power generator 1 according to the present invention. FIG. 1 is a vertical cross-sectional view of the vibration power generator 1, that is, a cross-sectional view of the vibration power generator 1 taken along a ZX plane. The vibration power generator 1 includes a first substrate 3 and a second substrate 5 both housed inside a housing not depicted in the drawings. The first substrate 3 and the second substrate 5 are configured to be able to move relative to each other while remaining opposite each other. In Embodiment 1, the second substrate 5 is fixed to the housing. In contrast, the first substrate 3 is connected at opposite ends thereof to the housing by springs and thus, the whole first substrate 3 is configured to move (vibrate) relative to the housing by external vibration externally applied to the vibration power generator 1. In FIG. 1, a vibration direction of the first substrate 3 is depicted by blanked arrows.

The first substrate 3 and the second substrate 5 are configured to be able to move relative to each other while remaining opposite and parallel to each other, in other words, while maintaining a constant spacing between opposite surfaces of the first and second substrates 3 and 5. Thus, charge generated by the action of electrets 2 on the first substrate 3 as described below can be collected by pairs of current collecting electrodes 6 and 7 on the second substrate 5, which can then supply the collected charge to load resistors 10 and 11 connected to the respective current collecting electrodes. The principle of power generation through the action of the electrets 2 is based on the conventional technique and is not described herein in detail. Furthermore, a configuration that retains a spacing between the first substrate 3 and the second substrate 5, that is, a configuration that allows smooth relative movement of the first and second substrates 3 and 5 to be maintained, is important for improving the efficiency of the power generation. However, such a configuration departs from the core of the present invention, and is thus not referred to below.

Now, the structure of the first substrate 3 side will be described. On a surface of the first substrate 3 opposite to the second substrate 5, a plurality of electrets 2 and a plurality of guard electrodes 4 each formed on a conductor are alternately arranged along a relative movement direction of the first substrate 3 and the second substrate 5 (vibration direction in FIG. 1). The plurality of electrets 2 corresponds to a group of electrets according to the present invention. The plurality of electrets 2 and the plurality of guard electrodes 4 are each shaped like a comb and nested. However, since FIG. 1 is a cross-sectional view taken along a ZX plane, the electrets 2 and the guard electrodes 4 are depicted to be alternately arranged. In Embodiment 1, the electrets 2 are configured to semipermanently retain negative charge. When the electrets 2 and the guard electrodes 4 are thus alternately arranged, the width of the electret 2 and the width of the guard electrode 4 in the relative movement direction are both denoted by w3. The spacing between the electret 2 and the guard electrode 4 in the relative movement direction is denoted by (d).

Now, the structure of the second substrate 5 will be described. On a surface of the second substrate 5 opposite to the first substrate 3, a group of electrodes is formed including a pair of electrodes (first current collecting electrode 6 and second current collecting electrode 7) which collects charge generated by the action of the electret 2 and which supplies power based on the charge to a load resistor. Specifically, the first current collecting electrode 6 and the second current collecting electrode 7 are formed on the second substrate 5 so as to be electrically insulated. The plurality of first current collecting electrodes 6 is aggregated to a terminal 6A via a wire L1 and connected to a grounded load resistor 10 via a terminal 10A. Moreover, the plurality of second current collecting electrodes 7 is aggregated to a terminal 7A via a wire L2 and connected to a grounded load resistor 11 via a terminal 11A.

For the group of electrodes formed on the second substrate 5, the width w1 of the first current collecting electrode 6 in the relative movement direction is set the same as the width w2 of the second current collecting electrode 7 in the relative movement direction. Furthermore, the spacing (a) between the first current collecting electrode 6 and the second current collecting electrode 7 is appropriately set so that the pitch of a set of electrode arrays repeated on the second substrate 5, that is, the pitch of the first current collecting electrode 6 and the second current collecting electrode 7, is the same p of a set of arrays repeated on the first substrate 3, that is, the pitch of the electret 2 and the guard electrode 4.

Figure 2:
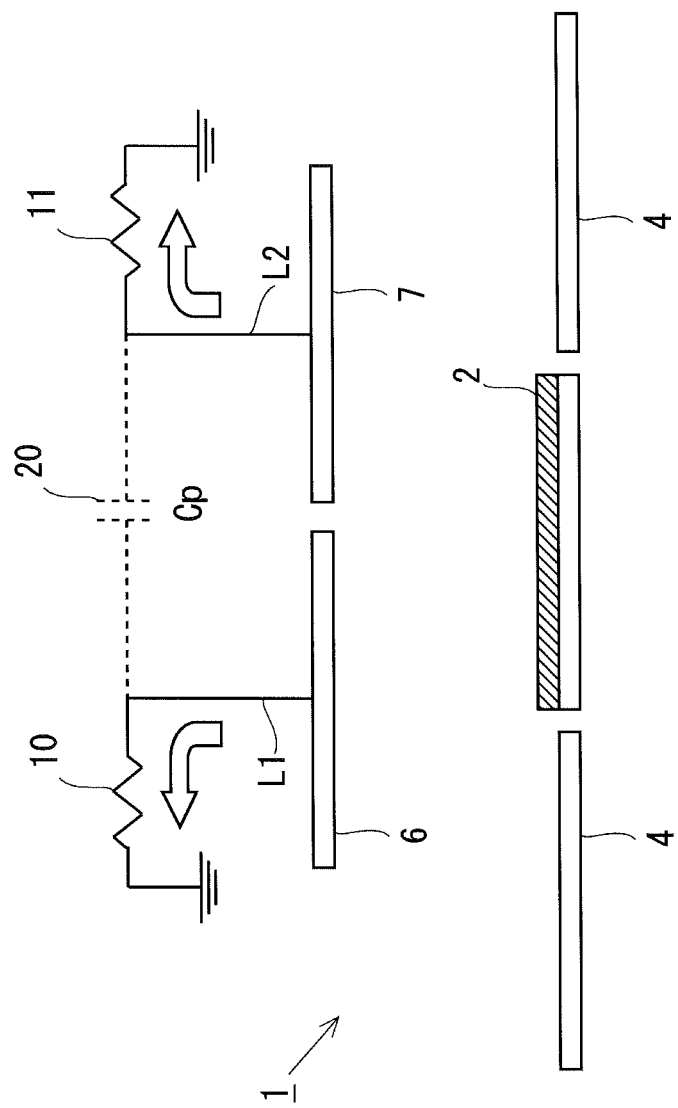
FIG. 2 is a model diagram of the vibration power generator depicted in FIG. 1.
Figure 3:
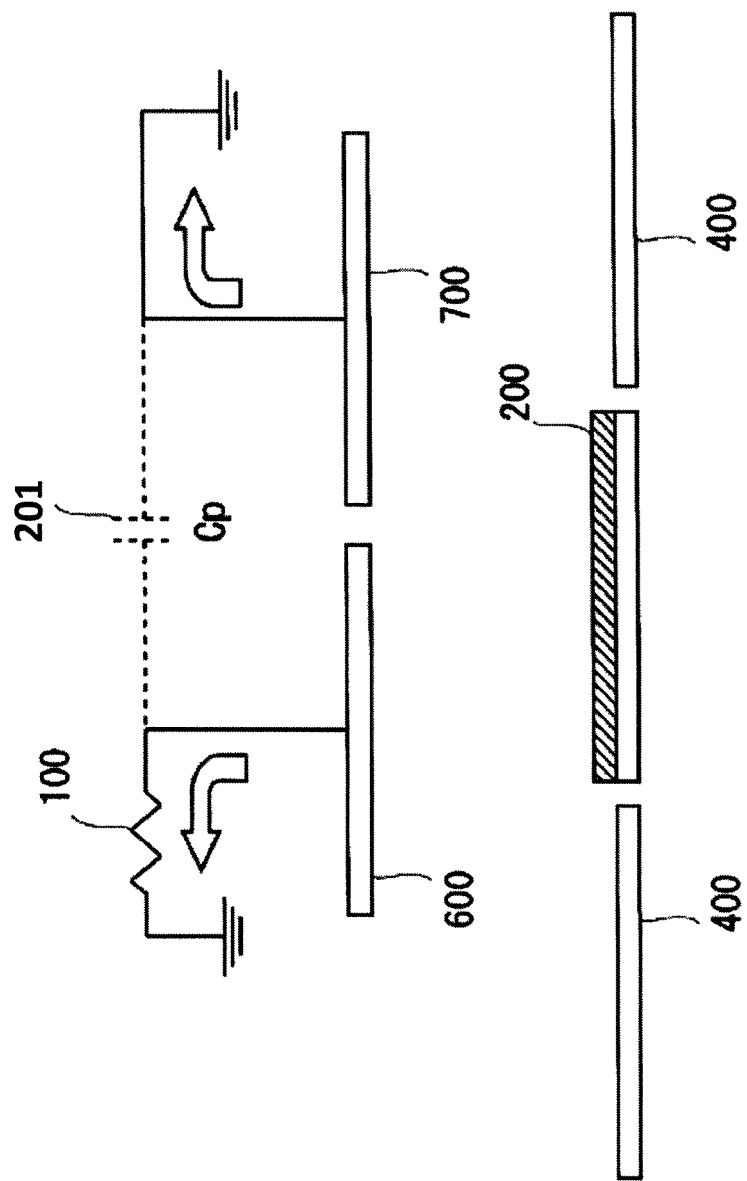
FIG. 3 is a model diagram of a vibration power generator according to a first reference example.

Power generation in the vibration power generator 1 having the configuration depicted in FIG. 1 as described above, and power supply to the load resistors 10 and 11 will be described based on FIG. 2 and FIG. 3. FIG. 2 is a model diagram of the vibration power generator 1 illustrating a parasitic capacitance between the first current collecting electrode 6 and the second current collecting electrode 7 depicted in FIG. 1. Elements in FIG. 2 which are identical to corresponding components of the vibration power generator 1 depicted in FIG. 1 are denoted by reference numerals identical to the reference numerals of the components. Furthermore, FIG. 3 is a model diagram of a vibration power generator according to a reference example for a comparison with the vibration power generator 1 depicted in FIG. 2. In the reference example depicted in FIG. 3, electrodes corresponding to the first current collecting electrode 6 and the second current collecting electrode 7 are formed as a first current collecting electrode 600 and a second current collecting electrode 700, respectively. However, only the first current collecting electrode 600 is connected to a load resistor 100 to which power is supplied, with the second current collecting electrode 700 directly grounded. A configuration for electrets 200 and guard electrodes 400 provided on a substrate opposite to a current collecting electrode-side substrate is the same as the configuration for the electrets 2 and the guard electrodes 4 depicted in FIG. 2.

Thus, in the reference example depicted in FIG. 3, only power based on charge collected by the first current collecting electrode 600 is supplied to the load resistor 100, whereas charge collected by the second current collecting electrode 700 merely migrates back and forth between the second current collecting electrode 700 and the ground surface. Therefore, in the reference example, although two types of current collecting electrodes are provided, only the first current collecting electrode 600 substantially supplies power to the load resistor 100. Consequently, the power supply from the current collecting electrodes is not efficient. On the other hand, in the vibration power generator 1 depicted in FIG. 2, charge collected by the first current collecting electrode 6 is supplied to the load resistor 10, whereas charge collected by the second current collecting electrode 7 is supplied to the load resistor 11. Hence, in principle, the two types of current collecting electrodes may be utilized to supply power to the load resistor.

However, in the group of electrodes formed on the second substrate 5 both in the vibration power generator 1 depicted in FIG. 2 and in the reference example depicted in FIG. 3, a parasitic capacitance section 20 or 201 that is an imaginary capacitance section acting to hinder migration of charge from the electrodes is present between the adjacent current collecting electrodes. The capacitance of the parasitic capacitance section 20 and the like (hereinafter simply referred to as the "parasitic capacitance") is in principle determined by the shape of end surfaces of the adjacent electrodes, the thickness of the electrode, the number of the electrodes, the length of the electrode, the dielectric constant of the substrate, the spacing between the electrodes, and the like. In the vibration power generator 1 depicted in FIG. 2, the parasitic capacitance of the parasitic capacitance section 20 present between the first current collecting electrode 6 and the second current collecting electrode 7 is denoted by Cp. Furthermore, in the reference example depicted in FIG. 3, the electrode spacing between the first current collecting electrode 600 and the second current collecting electrode 700 and the shape and size of the end surface of the electrode are the same as the electrode spacing and the shape and the size of the end surface in the example depicted in FIG. 2. Therefore, the parasitic capacitance of the parasitic capacitance section 201 present between the first current collecting electrode 600 and the second current collecting electrode 700 is also denoted by Cp.

The applicant has found that, although the vibration power generator 1 depicted in FIG. 2 uses the two current collecting electrodes to supply power, the parasitic capacitance section 20 present between the first current collecting electrode 6 and the second current collecting electrode 7 causes a variation in the degree of power supply from the current collecting electrodes to the load resistors connected to the respective current collecting electrodes in accordance with the magnitude of the load resistors, the variation affecting the amount of power supplied by the vibration power generator 1. Thus, the variation in the degree of power supply will be described based on FIG. 4. Conditions for vibration applied to the vibration power generator, that is, prerequisites for changes in the amount of power supply in FIG. 4 and FIG. 5 that is described below, are all the same throughout the specification.

Figure 4:
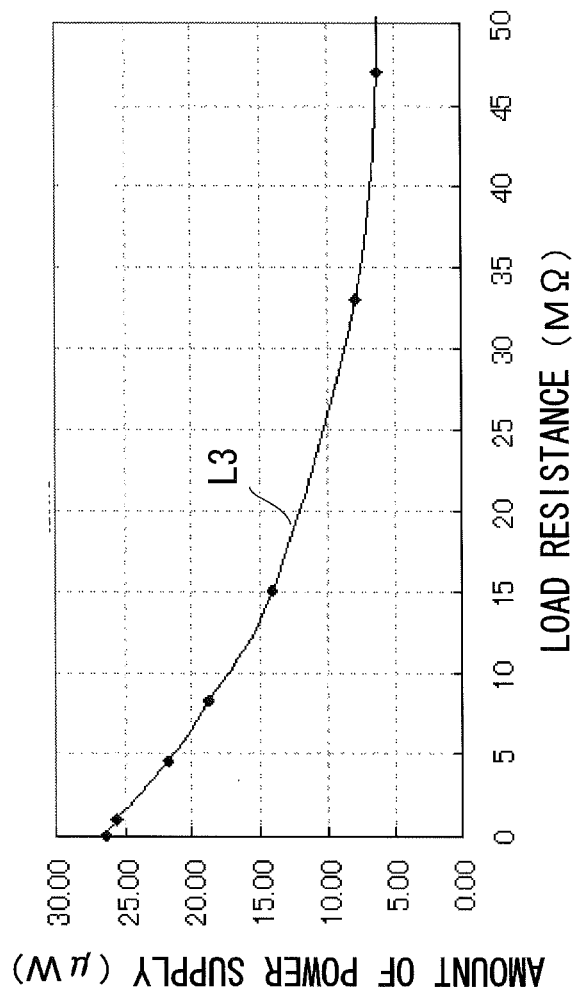
FIG. 4 is a diagram depicting changes in the amount of power supplied by a first current collecting electrode in the vibration power generator depicted in FIG. 2 when a resistance value of a load resistor connected to a second current collecting electrode is varied.

A graph (line L3) depicted in FIG. 4 is a diagram illustrating changes in the amount of power supplied to the load resistor 10 by the first current collecting electrode 6 with the load resistor 10 connected thereto in the model depicted in FIG. 2; the resistance value (impedance) of the load resistor 10 is set to 15 MΩ, which is the same as the internal impedance of the vibration power generator 1 depicted in FIG. 1, and the resistance value of the load resistor 11 is varied between 0 MΩ and 50 MΩ. Setting the resistance value of the load resistor 10 to 15 MΩ is based on the conventional concept of impedance matching. Furthermore, it is understandable from the graph depicted in FIG. 4 that the amount of power supplied by the first current collecting electrode 6 is maximized at about 27 µW when the load resistor 11 has a resistance value of 0Ω. This amount of power supply corresponds to the amount of power supplied only to the load resistor 100 by the first current collecting electrode 600 in the model depicted in FIG. 3 when the resistance value of the load resistor 100 is set to 15 MΩ, which is the same as the internal impedance of the vibration power generator in the model in FIG. 3. The maximum amount of power supply is hereinafter referred to as the "maximum amount of power supply for a single load".

As depicted in FIG. 4, with the resistance value of the load resistor 10 fixed at 15 MΩ, the amount of power supplied to the load resistor 10 by the first current collecting electrode 6 decreases with increasing resistance value of the load resistor 11. Then, when, as is the case with the load resistor 10, the resistance value of the load resistor 11 is 15 MΩ, which is equal to the internal impedance of the vibration power generator 1, the amount of power supplied to the load resistor 10 by the first current collecting electrode 6 is about 13.5 µW, which is about half the maximum amount of power supply for a single load. Thus, in this case, the total amount of power supplied by the two current collecting electrodes 6 and 7, that is, the amount of power supplied by the vibration power generator 1, is comparable to the maximum amount of power supply for a single load. On the other hand, when the resistance value of the load resistor 11 belongs to the range of resistance values larger than 0Ω and smaller than 15 MΩ, which is equal to the internal impedance of the vibration power generator 1 (the range is hereinafter referred to as a "low impedance range"), the amount of power supplied to the load resistor 10 by the first current collecting electrode 6 exceeds the half of the maximum amount of power supply for a single load.

As described above, a relatively large amount of power is supplied by the first current collecting electrode 6 when the resistance value of the load resistor 11 connected to the second current collecting electrode 7 belongs to the low impedance range. A possible cause of this is that a reduced impedance of the load resistor 11 suppresses the flow of charge into the parasitic capacitance section 20 between the first current collecting electrode 6 and the second current collecting electrode 7. Thus, it is expected that a decrease in the resistance value of the load resistor 11 reduces the degree of the adverse effect of the parasitic capacitance section 20, that is, the degree of hindrance to the power supply from the first current collecting electrode 6 to the load resistor 10 (migration of charge).

Figure 5:
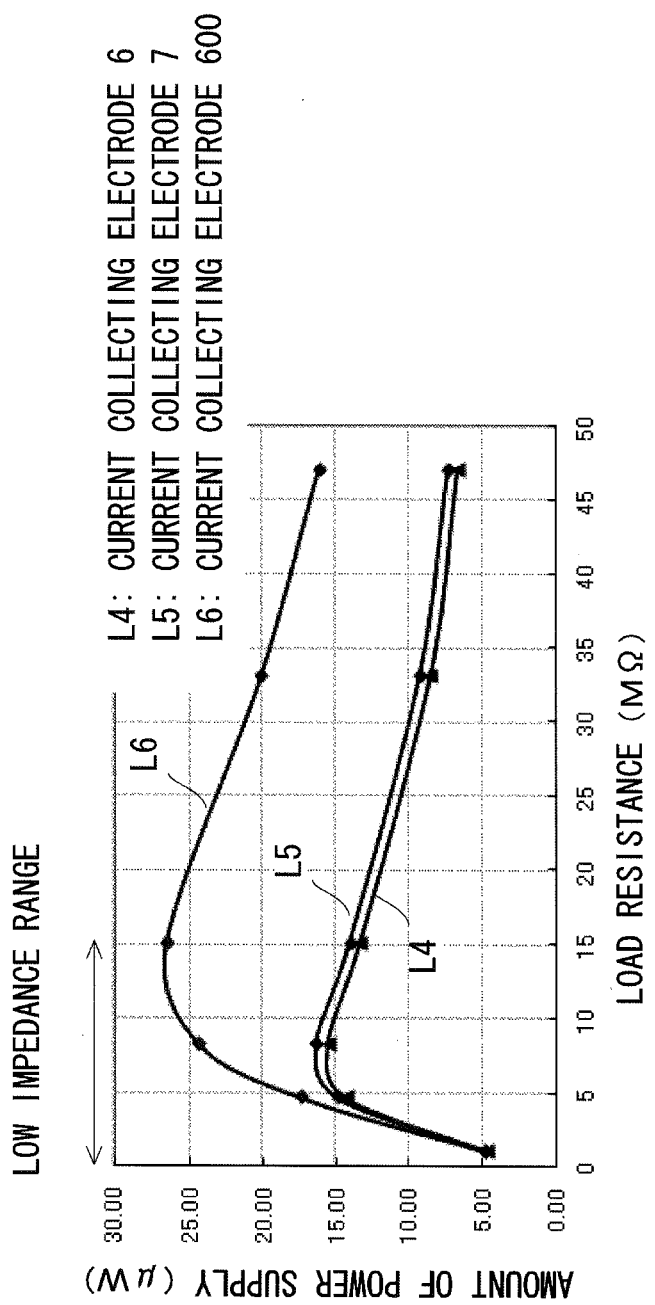
FIG. 5 is a diagram of a comparison between the vibration power generator depicted in FIG. 1 and a vibration power generator in a reference example in terms of the amount of power supply.

The degree of hindrance to the power supply caused by the parasitic capacitance section 20 is reduced by the above-described reduced impedance of the load resistor, and in connection with this finding, FIG. 5 depicts the correlation between the resistance values of the load resistors 10 and 11 and the amount of power supplied by the current collecting electrodes 6 and 7 connected to the load resistors 10 and 11, respectively, the correlation being observed when the resistance values are varied in the vibration power generator 1. FIG. 5 also depicts the correlation between the resistance value of the load resistor 100 and the amount of power supplied by the current collecting electrode 600 in the vibration power generator depicted in FIG. 3, the correlation being observed in the same way as above. Specifically, line L4 depicts changes in the amount of power supplied by the first current collecting electrode 6 when the resistance values of the load resistor 10 and the load resistor 11 are varied in the vibration power generator 1 depicted in FIG. 2. Line L5 depicts changes in the amount of power supplied by the second current collecting electrode 7 when the resistance values of the load resistor 10 and the load resistor 11 are varied in the vibration power generator 1 depicted in FIG. 2. Line L6 depicts changes in the amount of power supplied by the first current collecting electrode 600 when the resistance value of the load resistor 100 is varied in the vibration power generator in the reference example.

When the resistance values of the load resistors are 15 MΩ, which is equal to the internal impedance of the vibration power generator 1 depicted in FIG. 2 and the vibration power generator in the reference example, the amount of power supplied by each of the first and second current collecting electrode 6 and 7 is about 13.5 µW as depicted by line L4 and line L5. On the other hand, as depicted by line L6, the amount of power supplied by the first current collecting electrode 600 is about 27 µW, which is a peak value. Thus, the amount of power supplied by the vibration power generator 1 with the two current collecting electrodes (first current collecting electrode 6 and second current collecting electrode 7) supplying power is comparable to the amount of power supplied by the vibration power generator in the reference example which has substantially one current collecting electrode supplying power.

On the other hand, when the resistance values of the load resistors belong to the low impedance range (0Ω to 15 MΩ), the amount of power supplied by each of the first and second current collecting electrode 6 and 7 has a value exceeding the half of the amount of power supplied by the first current collecting electrode 600. Thus, in this case, the amount of power supplied by the vibration power generator 1 with the two current collecting electrodes supplying power exceeds the amount of power supplied by the vibration power generator in the reference example which has substantially one current collecting electrode supplying power. In other words, when power is supplied to a load with an impedance lower than the internal impedance of the vibration power generator, the amount of power supplied by the vibration power generator can be increased by adopting the configuration depicted in FIG. 2 (that is, the configuration based on the vibration power generator 1 with two current collecting electrodes supplying power) instead of the configuration in the reference example (that is, the configuration with substantially one current collecting electrode supplying power).

Another aspect of the power supply capability of the vibration power generator will be discussed. As described above, in the vibration power generator in the reference example, when the resistance value of the load resistor 100 is comparable to the internal impedance of the vibration power generator, the amount of power supplied by the vibration power generator is about 27 µW, which is the peak value. In the vibration power generator 1, when the resistance values of the load resistors 10 and 11 are close to 8 MΩ, which belongs to the low impedance range, the amount of power supply is about 16 µW, which is the peak value. Thus, in the vibration power generator 1, when the resistance values of the load resistors 10 and 11 are set to a value close to 8 MΩ, the total amount of power supplied by the apparatus is about 32 µW, which is about 20% more than the total amount of power supplied by the vibration power generator in the reference example.

Example 2

Figure 6:
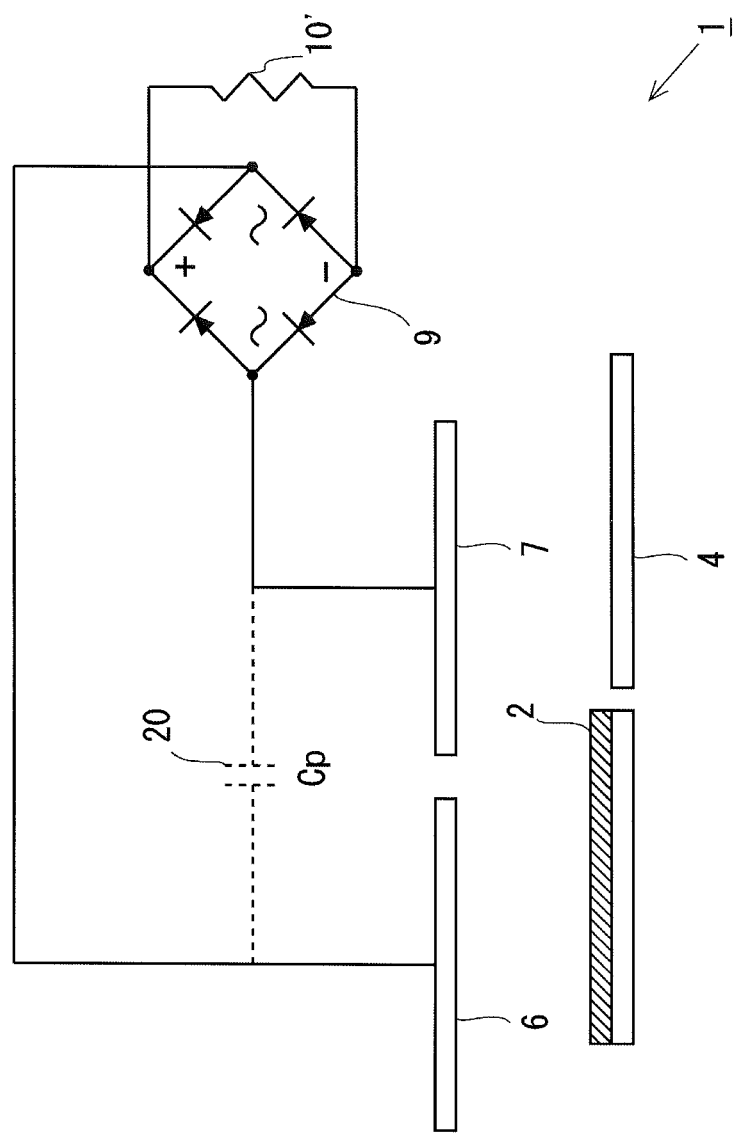
FIG. 6 is a model diagram of a vibration power generator according to a second embodiment of the present invention.

FIG. 6 depicts a model configuration of a second embodiment according to a vibration power generator 1 of the present invention. The model configuration depicted in FIG. 6 differs from the model configuration depicted in FIG. 2 in a configuration for a load resistor connected to a first current collecting electrode 6 and a second current collecting electrode 7. Specifically, in the model configuration depicted in FIG. 6, the first current collecting electrode 6 and the second current collecting electrode 7 are connected to two respective input terminals of a bridge full-wave rectifier 9. A load resistor 10' is connected to output terminals of the bridge full-wave rectifier 9. Thus, in the model configuration depicted in FIG. 6, power based on charge collected by the first current collecting electrode 6 and power based on charge collected by the second current collecting electrode 7 are synthesized via the bridge full-wave rectifier 9. The synthesized power is then supplied to the load resistor 10'. The configuration of the first current collecting electrode 6, the second current collecting electrode 7, the electret 2, and the like is the same as the model configuration depicted in FIG. 2.

Also in the vibration power generator 1 configured as described above, when the resistance value of the load resistor 10' is set to a value belonging to the low impedance range associated with the internal impedance of the vibration power generator 1, the amount of power supplied by the vibration power generator 1 can be increased and maximized as is the case with the model configuration depicted in FIG. 2.

<Variation>

In FIG. 6, a both-wave rectifier may be adopted instead of the full-wave rectifier 9. The technique relating to the both-wave rectifier is well known, and thus, the illustration of the configuration of the both-wave rectifier is omitted. In the both-wave rectifier, power supply loads connected through the both-wave rectifier include a power supply load connected to a positive synthesized output from the first current collecting electrode 6 and the second current collecting electrode 7, and a power supply load connected to a negative synthesized output from the first current collecting electrode 6 and the second current collecting electrode 7.

Other Embodiments

In the above-described vibration power generator 1, generated power is supplied to the load resistors 10 and 11. However, any of various types of loads can be adopted as a power supply load provided that the load can utilize power generated by the vibration power generator 1. For example, a capacitor (power storage circuit) that stores generated power or a voltage conversion circuit that converts the voltage of the generated power can be adopted as a power supply load. Alternatively, the power supply load may be a driving circuit (power supply circuit) for a sensor that detects an environment parameter (for example, temperature, humidity, or acceleration) for surroundings of an area where the vibration power generator 1 is installed, or may be a transmission circuit (regardless of whether the circuit is wireless or wired) that transmits the detected environment parameter to an external server.

REFERENCE SIGNS LIST

1 Vibration power generator
2 Electret
3 First substrate
4 Guard electrode
5 Second substrate
6 First current collecting electrode
7 Second current collecting electrode
9 Rectifier
10, 10', 11 Load resistor
20 Parasitic capacitance section
L1, L2 Wire

The invention claimed is:
1. A vibration power generator comprising:
a first substrate and a second substrate configured to be moved relative to each other by external vibration while remaining opposite each other;
a group of a plurality of electrets arranged in the relative movement direction on one surface side of the first substrate;
a group of electrodes arranged in the relative movement direction on a surface side of the second substrate opposite to the group of electrets, and including a first current collecting electrode and a second current collecting electrode; and
at least one power supply load, wherein the at least one power supply load comprises either:
a single power supply load electrically connected to each of the first and second current collecting electrodes; or
a first power supply load connected to the first current collecting electrode and a second power supply load connected to the second current collecting electrode, wherein power generated by the external vibration is supplied to the at least one power supply load, and wherein the single power supply load or each of the first and second power supply loads has an impedance lower than an internal impedance of the vibration power generator.

2. The vibration power generator according to claim 1, wherein the impedance of the single power supply load or of the first and second power supply loads is set to a predetermined high-efficiency impedance within a predetermined range of impedances lower than the internal impedance of the vibration power generator, the high-efficiency impedance serving to maximize an amount of generated power supplied to the at least one power supply load.

3. The vibration power generator according to claim 1, wherein power is supplied to the at least one power supply load when the first substrate and the second substrate are moved relative to each other by the external vibration.

4. The vibration power generator according to claim 1, wherein the first current collecting electrode and the second current collecting electrode are connected to the single power supply load via an identical rectifier.

5. The vibration power generator according to claim 4, wherein the rectifier is a full wave rectifier.

6. The vibration power generator according to claim 1, wherein the first power supply load connected to a positive synthesized output from the first current collecting electrode and the second current collecting electrode, and the second power supply load connected to a negative synthesized output from the first current collecting electrode and the second current collecting electrode are connected to the vibration power generator via individually formed rectifiers.

7. The vibration power generator according to claim 6, wherein the rectifier is a both wave rectifier.

8. The vibration power generator according to claim 1, wherein the first power supply load and the second power supply load are grounded independently of each other.

9. The vibration power generator according to claim 1, wherein the at least one power supply load comprises a power storage circuit that stores supplied generated power, a load circuit that performs a predetermined operation using the supplied generated power as a power supply, a voltage conversion circuit that converts a voltage of the supplied generated power, or a combination of any of the power storage circuit, the load circuit, and the voltage conversion circuit.

* * * * *